United States Patent [19]
Beller

[11] Patent Number: 5,178,126
[45] Date of Patent: Jan. 12, 1993

[54] ADJUSTABLE BARBEQUE GRILL

[75] Inventor: Frank W. Beller, Aurora, Ill.

[73] Assignee: Flame King, Inc., Aurora, Ill.

[21] Appl. No.: 814,144

[22] Filed: Dec. 27, 1991

[51] Int. Cl.⁵ ............................................. F24B 3/00
[52] U.S. Cl. ............................. 126/25 A; 126/25 R; 126/333; 126/41 R
[58] Field of Search ............ 126/25 A, 25 R, 29, 126/30, 332, 337 R, 152 R, 333, 41 R

[56] References Cited

U.S. PATENT DOCUMENTS

| | | | |
|---|---|---|---|
| 3,583,385 | 6/1971 | Beller | 126/25 A |
| 4,592,335 | 6/1986 | Beller | |
| 4,690,125 | 9/1987 | Beller | 126/25 A |
| 5,042,451 | 8/1991 | Beller | 126/25 A |

Primary Examiner—Larry Jones
Attorney, Agent, or Firm—Lee, Mann, Smith, McWilliams, Sweeney & Ohlson

[57] ABSTRACT

An adjustable grill assembly for a barbeque grill having outwardly extending support projections supportingly engaged in notches of four corner support brackets that extend upward from the firebox and are attached therebelow to the front and rear walls of the firebox. A pivoting hood covers the barbeque grill and provides cut-out apertures at opposite ends whereby the handles of the grill extend grill outwardly of the hood to facilitate grill-height adjustment while the hood is closed.

12 Claims, 2 Drawing Sheets

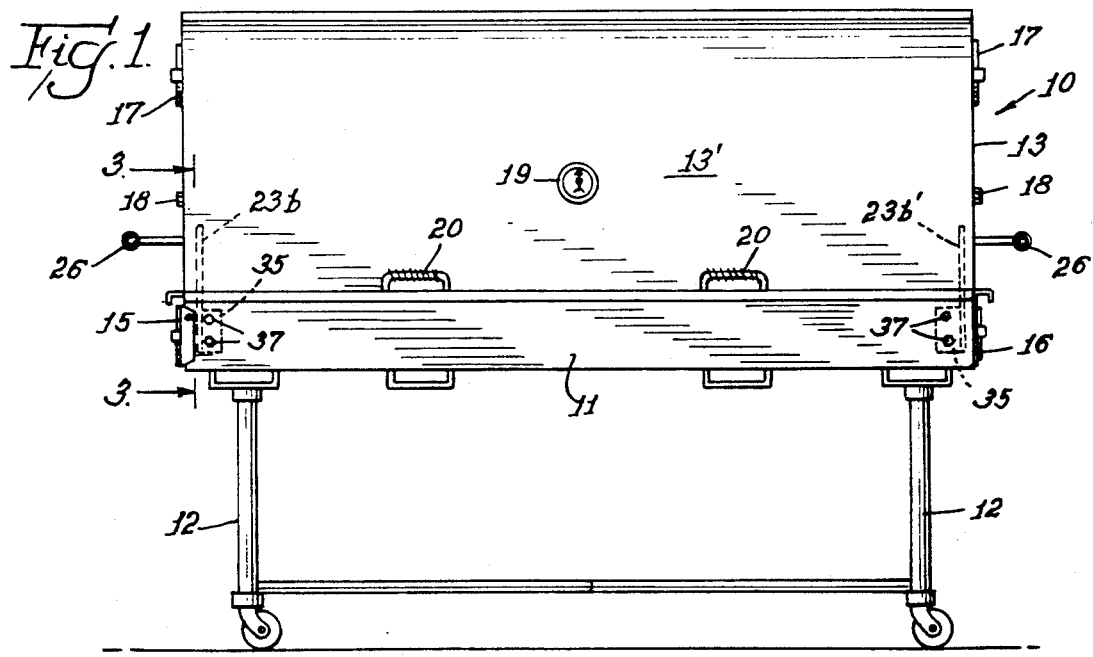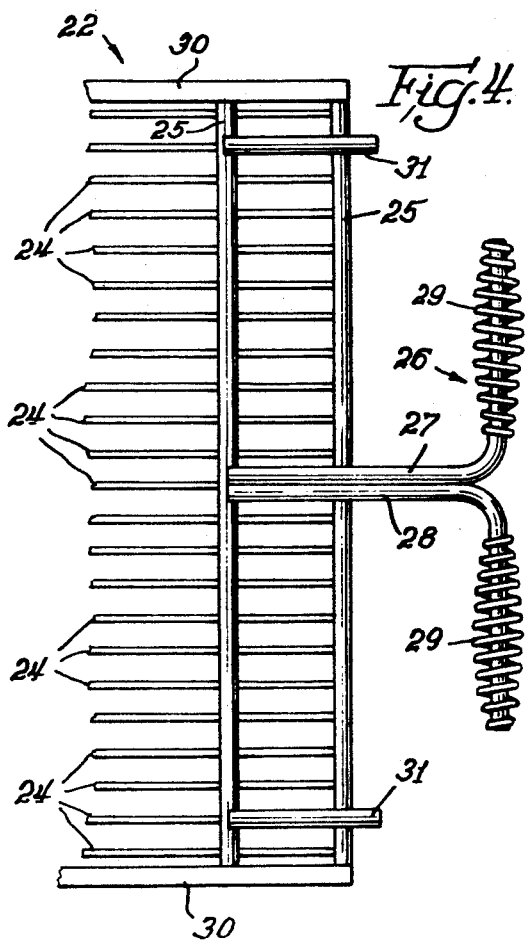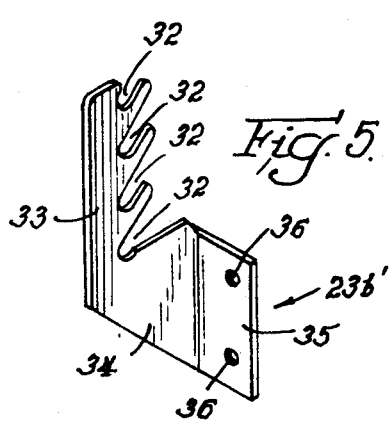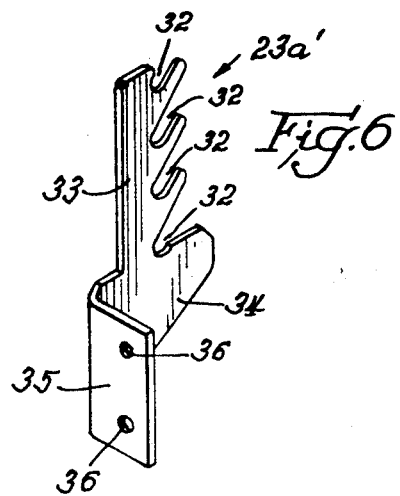

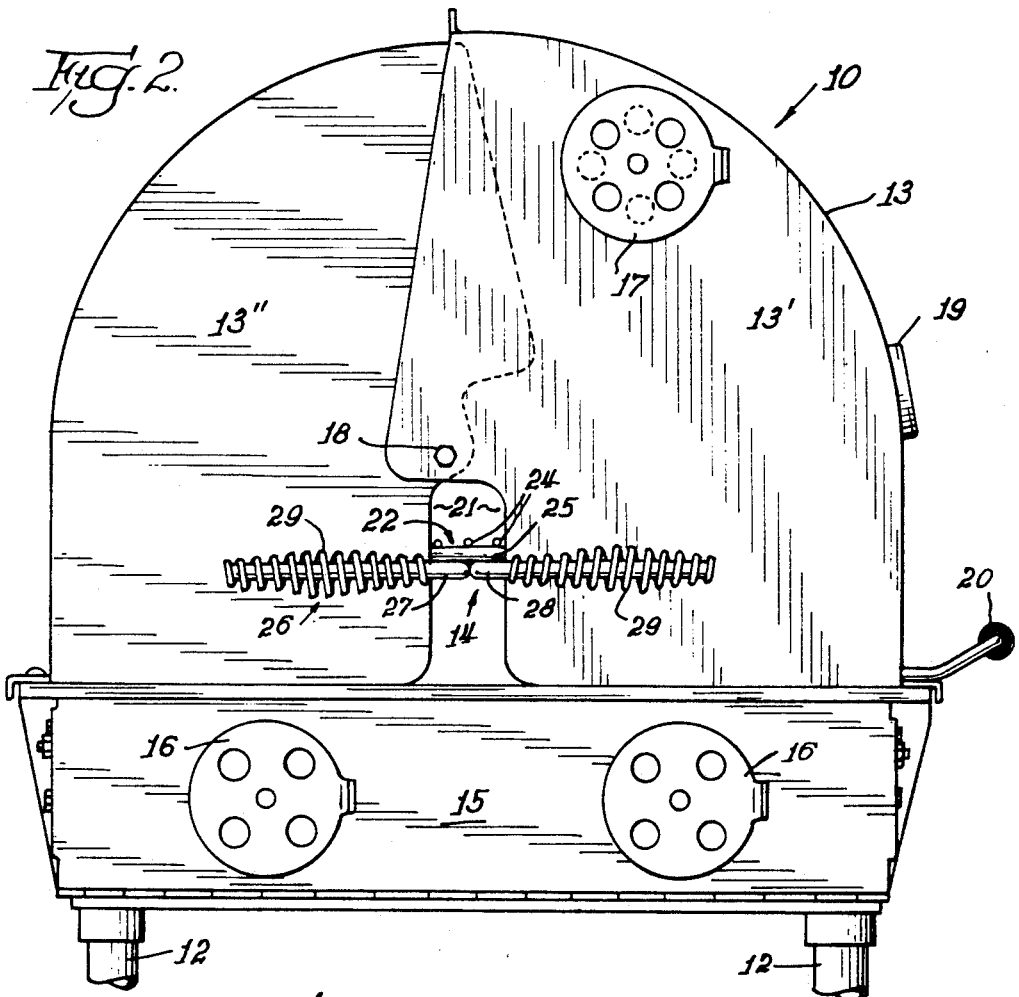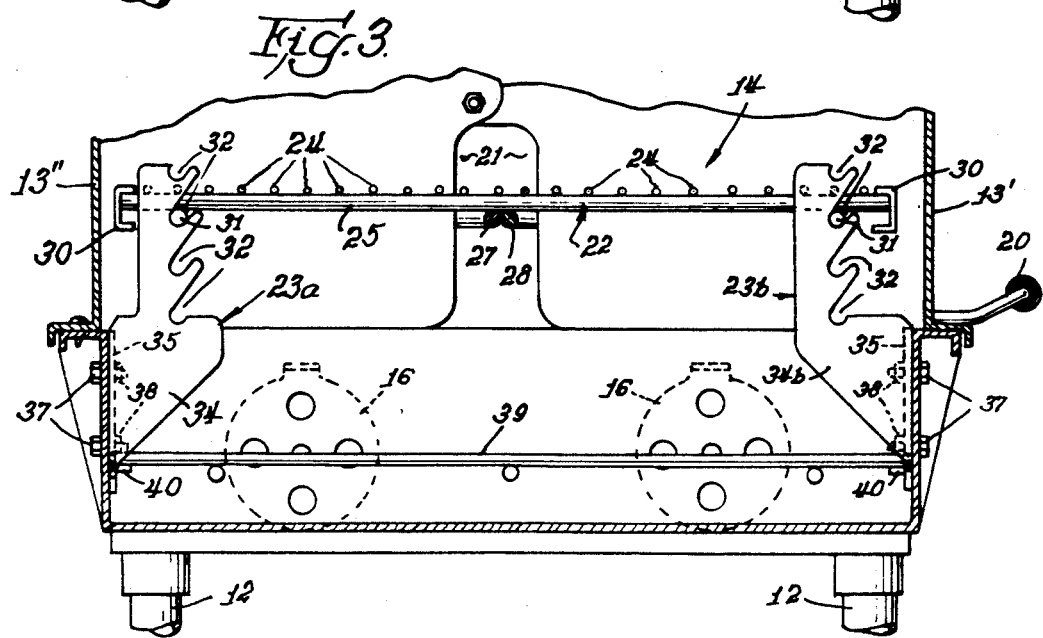

ADJUSTABLE BARBEQUE GRILL

BACKGROUND OF THE INVENTION

The invention generally relates to an adjustable grill for an oven-type barbeque device. More particularly, it is directed toward a large outdoor barbeque oven having a hood covering over a firebox containing a grill disposed above a heat source.

Outdoor barbeque devices typically provide nickel-plated grills for receiving food items to be cooked such a bratwurst, hotdogs, hamburgers, shish-ka-bobs, chicken, vegetables, and the like. Due to the wide variety of foods to be barbequed and the various requirements of cooking times and temperatures, it has become advantageous to provide for adjustment of the grill relative to the fire bed or heat source in order to dispose the food items at selected orientations within the oven.

Often outdoor cooking devices have large covers, which usually are unitary or telescoping-type hoods pivotally arranged above the firebox. It would therefore be desirable to provide an adjustable grill that can work in conjunction with such a large hooded covers. More specifically it would be advantageous to make grill adjustment possible from the exterior of the barbeque oven while the hood remains in place so that constant temperature can be maintained.

For cooperation with hinged hoods, handles are typically provided to extend outwardly of the firebox, whereby the entire grill may be lifted and positioned. For example, my U.S. Pat. Nos. 4,592,335 and 5,042,451 provide for exterior adjustability. In U.S. Pat. No. 4,592,335, a slant adjustable grill coacts with grill support panels that extend upwardly from the firebox end walls. A hinged hood is provided with pairs of apertures for the arms of the grill handles to extend outwardly facilitating adjustment while the hood remains closed. In that patent, the grill handles are supported in notches of the support panel at opposite ends of the grill so that vertical adjustability is permitted, including the capacity for slant adjustment both longitudinally and transversely of the firebox. My U.S. Pat. No. 5,042,451 teaches an improvement upon the first noted patent by eliminating the requirement for grill support panels to be associated with the firebox end walls for supporting the handles above the firebox. U.S. Pat. No. 5,042,451 further improved upon the earlier invention by eliminating the need for dual openings at both ends of the hood, which were required for accommodating two arms of the handle that engage support panels at both ends of the barbeque grill. My later patent discloses that only a single grill arm is required to extend outwardly through single apertures at either end of the hood. The grill support members in this later patent consist of legs that depend downwardly from the grilling member and are engageable at notches of grill supports that reside within, and are attached to the bottom wall of, the firebox. By moving the support panels away from the firebox end walls, as in my U.S. Pat. No. 4,592,335, adjustability is available while allowing for a pivotal clean-out door to comprise an end wall of the barbeque grill.

In the adjustable grill of my U.S. Pat. No. 5,042,451, the exemplary grill includes front and rearwardly slanted depending legs that terminate in transversely bent projections arranged at each corner of the grill. The transversely bent projections extend in opposite directions at each end of the grill for purposes of preventing horizontal dislocation of the grill when engaged at the notches of the support plates. While the invention disclosed in my patent is very useful, it would nonetheless be desirable to eliminate depending leg extensions and transverse projections whereby to eliminate extra material costs and also to avoid the problems inherent in extensions or projections. The minimization of such projections and extensions would alleviate damage concerns and misalignment problems due to bending and the like during shipping and handling, and also when assembled and used by the purchaser. However, coupled with the elimination of such projections and extensions, it would further be desirable to offer an adjustable grill that requires only single apertures or openings at the ends of the hoods to permit T-shaped grill handles to project outwardly of the single hood apertures.

It is therefore also a main object of the present invention to minimize extensions from a grill for use in conjunction with notched supports for grill adjustment. Concomitantly, it is a goal to provide support panels for an adjustable grill that may be attached to the firebox without connection to the end walls whereby the end walls may optionally take the form of clean-out doors.

It is further an objective of the invention to provide for the sidewall attachment of the grill supports and arrange the engageable notches for supporting the grill to be at or above the firebox.

It is further an object of the invention to provide a slant and vertically adjustable grill that permits the grill supports to be spaced above and away from the end and bottom walls, and the firegrate of the firebox, so as to create minimum interference with heat sources or clean-out mechanisms.

It is also a goal of the invention to provide for an adjustable grill with the minimization of adjustment components that permits the full use of a grill surface for cooking as in my said two previous patents.

SUMMARY OF THE INVENTION

The adjustable barbeque grill may be summarized as providing a grill formed to have longitudinal grilling rods supported therebelow by transverse support rods in a known way, wherein oppositely directed T-shaped handles are affixed to the support rods and extend grill outwardly through apertures at the opposite ends of the oven hood, particularly of the type which is a bread-box type pivoting hood. The barbeque grill is adjustably supportable at grill support projections extending endwise slightly outwardly of the last support rod from both ends of the grill and parallel to the stems of the T-shaped handles. The adjustable engagement for the support projections is provided by notched support brackets having transverse engageable flanges for mechanical fastening to the long walls of the firebox whereby to dispose the notches adjacent the end walls and above the firebox. Thereby, the grill support projections are notch-engageable to the brackets at various positions above the firebox. The grill support projections are located inwardly of the front and rear of the grill and the brackets extend firebox—inwardly—spaced away from opposite ends of the grill—so that the full grill surface is unimpeded by the adjustment means formed by the grill support projections and their respectively engaged support brackets.

BRIEF DESCRIPTION OF THE DRAWINGS

FIG. 1 is a front elevational view of a barbeque grill having a bread-box pivoting hood shown in the closed state over a firebox, the firebox being movably supported on wheeled legs, wherein at the left and right front corners of the firebox, grill engageable support brackets are shown in dashed lines, and the handles of the grill extend hood-outwardly at opposite ends thereof;

FIG. 2 is an end view of the firebox and closed hood of the grill as in FIG. 1 and showing the handle for the adjustable grill extending outwardly of a hood opening and an end clean-out door of the firebox;

FIG. 3 is a vertical section taken generally along line 3—3 of FIG. 1 looking in the direction of the arrows and showing the attachment of the grill support projections at the support brackets at the left rear corner and right front corner of the barbeque grill relative to FIG. 1;

FIG. 4 is a partial bottom view at one end of the grill and showing the attachment of a T-shaped handle and grill support projections to transverse support rod members extending below longitudinal grill rod members;

FIG. 5 is a perspective view of the right front bracket shown in dashed lines in FIG. 1; and, FIG. 6 is the right rear bracket which is located behind the right front bracket of FIG. 5 relative to FIG. 1.

DETAILED DESCRIPTION OF THE INVENTION

The invention will be explained with reference to the drawings wherein like reference numerals throughout FIGS. 1-6 refer to the same elements.

With respect first to FIG. 1, a barbeque grill 10 is shown having a known hood, firebox and fire grate arrangement, particularly suitable for use with the invention. This type of outdoor barbeque grill is also generally shown in my U.S. Pat. Nos. 4,592,335; 4,882,985; and, 5,042,451. It will be apparent to those skilled in the art that the present invention, however, is usable with a wide variety of barbeque grill devices, ovens, roasters, and the like.

The barbeque grill 10 is outwardly distinguished by three components, namely, a firebox 11, legs 12 mounted on wheels for moving the grill 10, and a closeable hood or lid 13. In the exemplary embodiment, the hood 13 is a bread-box type of hood, as shown in my U.S. Pat. No. 4,882,985, whereby front and rear portions 13' and 13" are relatively pivotable whereby to grant access to the firebox 11 primarily from the front, but also optionally from the rear, if desired.

Viewing FIGS. 2 and 3 in conjunction with FIG. 1, it will be seen that the hood 13 encloses an adjustable grill assembly 14 embodying the invention. The barbeque oven 10 also comprises a hinged clean-out door 15 and vents 16 at opposite ends of the firebox 11. In the illustrative embodiment, the hood 13 further includes a standard vent 17 on the front shell 13' of the hood 13 which pivots at hinge 18 to pivot over said rear shell 13" in a known manner. A thermometer 19 is provided at the front of the shell 13' for monitoring interior temperatures. Handles 20 are arranged to open and close the hood 13. As best shown in FIG. 2, the shells 13' 13" are cut-out at both ends to form openings or apertures 21, allowing for the adjustment of the grill assembly 14 while the hood 13 is closed, as will be explained below.

The adjustable grill assembly 14 will be more fully comprehended with reference to FIGS. 4-6. The adjustable grill assembly 14 is comprised of a grill 22 and four different support brackets comprising two mirror image rear corner support brackets 23a, 23a' and two mirror image front corner support brackets 23b, 23b'. The rear support bracket 23a and 23a' opposingly face and the front support brackets 23b and 23b' opposingly face.

The grill 22 is comprised of a plurality of parallel longitudinal grill rods 24 onto which the foods items to be cooked are placed in the usual manner. The longitudinal grill rods 24 are affixed, preferably by welding, onto a plurality of transverse support rods 25. As shown in FIG. 4, two of the support rods 25 reside at both the grill ends and have affixed to the underside thereof, preferably by welding, T-shaped handles 26 at either end of the assembly 14. The T-shaped handles 26 are formed by two L members 27, 28 that are welded together to project the arms of the T-shaped in opposite directions, as shown in FIG. 4. The oppositely directed arms of the T are attached by conventional steel coil grips 29 to allow the handles 26 to be grasped without conductive heat burning the hands of the chef. As shown in FIGS. 1 and 2, the T-shaped handles 26 extend outwardly through the openings 21 of the hood 13 at either end of the oven 10 to dispose the coil grips 29 for grasping by the user to facilitate lifting and adjusting the assembly 14, as will be described below. Longitudinal frame channels 30 are weld-engaged to the ends of the support rods 25 and serve to rigidify the grill 22. In the exemplary embodiment, the grill rods 24, the support rods 25, the handles 26 and channels 27 are made of nickel chrome plated steel, which is commonly employed for constructing grills and well-suited for the invention, as would be clear to those skilled in the art.

The support brackets 23a, 23a' and 23b, 23b' cooperate with the grill 22 for the adjustable positioning of the grill 22 relative to the firebox 15 by means of engageable grill support projections 31 extending outward from opposite ends of the grill 22 best viewed in FIGS. 3 and 4. Two projections 31 at the left end of the grill 22 engage with the support brackets 23a and 23b, which longitudinally oppose, and are engaged by the projections 31 at the right end, the mirror image brackets 23a' and 23b', respectively. The grill support projections 31 extend longitudinally outward of the grill 22 from the end-most support rods 25 a distance sufficient to engage the support brackets 23a, 23b, 23a' and 23b', but stop short of the hood 13 to prevent any interference with the opening and closing thereof.

The engagement of the support projections 31 at the support brackets 23a, 23a', 23b, and 23b' is accomplished by the provision of a plurality of substantially identical slanted notches 32 formed in each support bracket 23a, 23a', 23b, and 23b'. The support brackets 23a, 23a', 23b and 23b' are constructed whereby corresponding ones of each plurality of notches 32 reside in the same horizontal plane, so that the grill 22 may be arranged with the support projections 31 on a common horizontal plane and orient the grill 22 to be level within the oven 10. As shown in FIGS. 2 and 3, the support projections 31 are shown to be engaged in the second from the top notches 32 of each support bracket. As illustrated, the openings 21 are sufficiently tall to allow the upward movement of the handles 26 to dispose the support projections 31 in the topmost notches 32 while the hood 13 is closed. The support projections 31 are rigidly affixed to the grill 22 by being attached at the undersides of two end-adjacent cross support rods 25, preferably by welding, as shown in the bottom view of FIG. 4. To make a vertical adjustment, the handles 26 are grasped at opposite ends of the oven 10 and lifted at an inclination so that the support projections 31 move outward of the slanted notches 32 in an upward incline caused by the slanted configurations of the notches 32, similar to the notch configurations in my said U.S. Pat. Nos. 4,592,335 and 5,042,451. As the support projections 31 exit the engaged notches 32, the grill 22 may then be lifted upwardly or lowered downwardly for subsequent engagement at different notch elevations. Further, the grill 22 may be slanted longitudinally or transversely by means of disposing the projections 31 at either end of the assembly 14 in notches 32 of the brackets 23a, 23b that are at different elevations than at the brackets 23a', 23b', or by disposing the support projections 31 at the front of the grill 22 in notches 32 of the brackets 23b, 23b' at different elevations than at the rear in the notches 32 of the brackets 23a, 23a', respectively. The slant and vertical adjustments both being possible while the hood 13 is closed.

The construction of the support brackets 23a, 23a', 23b and 23b' will now be explained in greater detail in conjunction with FIGS. 3, 5 and 6. At the rear of the firebox 15, the left rear support bracket 23a opposes—lengthwise of the grill 22—the right rear support bracket 23a'. At the front of the firebox 15, the left front support bracket 23b opposes—lengthwise of the grill 22—the right front support bracket 23b'. Each support bracket has a vertical flange 33, lower co-planar flange 34 and transverse attachment flange 35. Each vertical flange 33 has the slanted notches 32 formed therein and each attachment flange 35 includes bolt holes 36 therethrough. The opposing support brackets 23a and 23a' are mirror images and the support brackets 23b and 23b' are mirror images.

The reference numerals 33, 34, 35 and 36 are commonly used for all four of the brackets 23a, 23a', 23b and 23b', although it will be understood that all four of the brackets orient their respective elements 33-36 differently. Specifically, at the rear of the barbeque grill 10, the opposing support brackets 23a and 23a' have the transverse attachment flanges 35 attached to the lower flanges 34 in a difference of 180 degrees whereby to be opposed and to enable the attachment of the attachment flange 35 to the firebox in order to dispose the notches 32 close to the ends of the firebox 11. It will be therefore seen that the support brackets 23a and 23a' have the lower flange 34 extending in a direction opposite from the opening of the slanted notches 32 so that the notches incline upwardly from the back of the barbeque grill 10 toward the front of the grill, i.e. to open toward the front of the barbeque grill 10 when the shell 13' is open. Oppositely, because the support brackets 23b and 23b' are attached to the front of the firebox 11, the lower flanges 34, as best viewed in FIG. 5, project forward of the slanted notches 32 and terminate in the transverse attachment flanges 35. Thus, the support brackets 23b and 23b' are mirror images and only differ in that the attachment flanges 35 are in 180 degree rotational arrangement allowing for the attachment to the front wall of the firebox 11 in order that disposition of the slanted notches 32 be closely adjacent the ends of the firebox 11, as best viewed in FIG. 1 in phantom lines. Thus, the difference in configuration for support brackets 23a and 23a' is the direction of the attachment of the attachment flange 35 in 180 degree relationship. Likewise the difference between support brackets 23b and 23b' is the direction of attachment of the attachment flanges 35. The differences between the front support brackets 23b and 23b' and the rear support brackets 23a and 23a' is that in the former the lower flanges 34 extend frontwardly of the notches 32, and in the latter, they extend rearwardly, thereby arranging the attachment flanges 35, respectively, either forwardly or rearwardly of the vertical flanges 33 as seen in FIGS. 3, 5 and 6.

The attachments of the support brackets 23a, 23a', 23b and 23b' are provided by means of bolt holes 36 receiving bolts 37 therethrough for affixation to the long walls of the firebox 11, which bolts are secured by means of nuts 38 threadingly engaged thereto interiorly of the firebox 11 to secure the attachment flanges 35 tightly to the firebox 11.

As best viewed in FIG. 3, it will be seen that a conventional fire grate 39 is provided for holding charcoal, wood, mesquite, or other combustible material for cooking. The fire grate 39 is supported by brackets 40 which are also attached to the front and rear long walls of the firebox 11. The arrangement of the grate 39 is fully independent of the support brackets 23a, 23a', 23b, 23b' and the grill 22. Further, the support brackets 23a, 23a', 23b and 23b' are also fully independent of the clean-out door 15 and the opening and closing operation of either of the pivoting shells 13' or 13" comprising the hood 13. Also in FIG. 3, it will be observed that by the disposition of the support brackets 23a, 23a', 23b and 23b' above the fire grate 39, and therefore above the bottom of the firebox firebox 11 for engagement by the support projections 31. Thus, this invention eliminates the requirement for depending legs and transverse projections to project into the firebox, as in my U.S. Pat. No. 5,042,451. A simplification of engageable elements thereby is provided while still achieving full adjustment from the exterior of the hood 13 while it is closed by the manipulation of the handles 26—and thus the grill 22—within the closed barbeque oven 10.

The foregoing provides a detailed description of one embodiment of the invention. It will be apparent to those skilled in the art that many other equivalents fall within the broad scope of the claims appended hereto.

What is claimed:

1. A barbeque grill having a rectangular firebox, a closable hood for covering the firebox having an opening at opposite ends thereof, a source of heat for cooking food and an adjustable grill assembly, the grill assembly comprising a grill portion for supporting food and a grill support means, the grill portion having a series of food supporting grill rods mounted on crossing support rods and handle means extending longitudinally from opposite ends of the grill portion to extend through one said opening at each of the ends of the closable hood, the grill support means including four support projections extending longitudinally of the grill portion outwardly thereof to stop short of said closable hood and said grill support means further including four separate grill support brackets generally at each of four corners of the rectangular firebox, the support brackets having a plurality of notches being located above the firebox for supportive receipt of said support projections above the firebox and means for attaching to the firebox, said means for attaching to the firebox being located within the firebox, wherein said grill portion is adjustable upwardly and downwardly by moving the handle means to disengage the support projections from said notches and reposition said support projections in others of said notches.

2. The barbeque grill as claimed in claim 1 where the notches of said support brackets are generally upwardly slanted notches.

3. The barbeque grill as claimed in claim 1 wherein said support brackets include a vertical flange portion having said notches formed therein and the means for attaching to the firebox including transverse attachment flange means for attachment to said firebox.

4. The barbeque grill as claimed in claim 1 wherein said support projections extend from below the plane of said grill rods.

5. The barbeque grill as claimed in claim 1 wherein said handle means and support projections are attached to said crossing support rods of the grill portion.

6. A barbeque grill having:
a firebox with means for providing a heat source for cooking;
a pivotal hood for covering the firebox having an opening at each of opposite ends thereof,
a grill means for placing food thereon;
leg support means for supporting the firebox;
wherein said grill means further being an adjustable grill assembly comprising:
a grill member having grill rods arranged longitudinally of the firebox and being affixed to transverse support rods;
handle means mounted to the grill member and extending longitudinally from the grill member from opposite ends thereof and extending through the one said hood opening at each said opposite ends of the hood;
four grill support projections mounted to said grill member and extending longitudinally from said grill member to stop short of the respective ends of the hood;
four separate support bracket means arranged at four corners of the firebox and having support projection-engageable notch means arranged above said firebox and means for attaching said support bracket means to the firebox, said means for mounting residing interiorly at the firebox generally below said notch means, said notch means supportively engaging the support projections above the firebox whereby to dispose the grill member at selectable locations relative to the firebox.

7. The barbeque grill as claimed in claim 6 wherein the notch means of said support bracket means comprise a plurality of upwardly slanting notches.

8. The barbeque grill as claimed in claim 6 wherein said closable hood comprises two relatively pivotal shell portions.

9. The barbeque grill as claimed in claim 6 wherein said support projections comprise four extending rod-like members extending generally longitudinally and outwardly of said grill member generally at four corners thereof.

10. The barbeque grill as claimed in claim 6 wherein said support bracket means comprise a vertical flange portion and transverse flange portion, said vertical flange portion having said notch means formed therein and said transverse flange portion being bent at right angles to the vertical flange portions and forming said means for attachment to said firebox.

11. The barbeque grill as claimed in claim 10 wherein said firebox includes front and rear long walls and two opposing end walls, wherein two opposing mirror image support brackets are attached to said rear long wall and wherein two opposing mirror image support brackets are attached to said front long wall.

12. The barbeque grill as claimed in claim 6 wherein said handle means comprise T-shaped members having the stem of the T extending longitudinally from said grill member and the arms of the T being transverse to the grill rods of the grill member.

* * * * *